(12) United States Patent
Hirano et al.

(10) Patent No.: US 10,914,358 B2
(45) Date of Patent: Feb. 9, 2021

(54) BALANCER DEVICE FOR INTERNAL COMBUSTION ENGINE

(71) Applicant: HITACHI AUTOMOTIVE SYSTEMS, LTD., Hitachinaka (JP)

(72) Inventors: Takashi Hirano, Atsugi (JP); Masaharu Kitamura, Atsugi (JP)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 0 days.

(21) Appl. No.: 16/489,679

(22) PCT Filed: Feb. 6, 2018

(86) PCT No.: PCT/JP2018/003883
§ 371 (c)(1),
(2) Date: Aug. 28, 2019

(87) PCT Pub. No.: WO2018/168257
PCT Pub. Date: Sep. 20, 2018

(65) Prior Publication Data
US 2020/0232538 A1    Jul. 23, 2020

(30) Foreign Application Priority Data

Mar. 16, 2017 (JP) ................................. 2017-050721

(51) Int. Cl.
*F01M 1/02* (2006.01)
*F16F 15/26* (2006.01)
*F01M 11/02* (2006.01)

(52) U.S. Cl.
CPC ........... *F16F 15/265* (2013.01); *F01M 11/02* (2013.01); *F16F 15/267* (2013.01); *F01M 2011/028* (2013.01); *F16F 2230/04* (2013.01)

(58) Field of Classification Search
CPC .. F01M 1/02; F01M 2001/0269; F16F 15/264
See application file for complete search history.

(56) References Cited

U.S. PATENT DOCUMENTS

| 2010/0154735 | A1* | 6/2010 | Kato | F16F 15/267 |
| | | | | 123/192.2 |
| 2013/0146015 | A1* | 6/2013 | Akaishi | F16F 7/10 |
| | | | | 123/192.2 |

(Continued)

FOREIGN PATENT DOCUMENTS

JP    2016-094969 A    5/2016

OTHER PUBLICATIONS

International Search Report dated Mar. 20, 2018 in International Application No. PCT/JP2018/003883.

(Continued)

*Primary Examiner* — Long T Tran
(74) *Attorney, Agent, or Firm* — Foley & Lardner LLP

(57) ABSTRACT

Balancer device has upper and lower housings 3 and 4 having therein an accommodation section 10, a pair of drive and driven side shafts 5 and 6 which are rotatably supported by four plain bearings 11 to 14 provided in the accommodation section and to which a rotation force is transmitted from a crankshaft, and arc band-shaped thrust receiving portions 32a and 33a which thrust flange portions of drive and driven gears 8 and 9 provided at the drive and driven side shafts respectively can contact from a thrust direction. First and second oil storing grooves 34 and 35, groove passages 36 and 37 and vertical groove passages 38a to 39b are formed at the thrust receiving portions on a gravity direction lower side with respect to a meshing portion of the both gears. With this configuration, it is possible to suppress occurrence of abrasion of the thrust receiving portion.

19 Claims, 12 Drawing Sheets

(56) References Cited

U.S. PATENT DOCUMENTS

2018/0163816 A1\* 6/2018 Kitamura ................. F16C 3/20
2019/0345852 A1\* 11/2019 Kato ....................... F04C 15/00

OTHER PUBLICATIONS

Written Opinion of the International Searching Authority dated Mar. 20, 2018 in International Application No. PCT/JP2018/003883.

\* cited by examiner

US 10,914,358 B2

BALANCER DEVICE FOR INTERNAL COMBUSTION ENGINE

TECHNICAL FIELD

The present invention relates to a balancer device used for an internal combustion engine.

BACKGROUND ART

In a general balancer device used for an internal combustion engine which is disclosed in Patent Document 1, as a transmission unit of power from a crankshaft, a pair of balancer shafts supported in an accommodation section formed between an upper housing and a lower housing and drive and driven side helical gears provided at each balancer shaft are used. A thrust load in a rotation axis direction of the balancer shaft occurs at each balancer shaft by and according to rotation of the both helical gears.

For this reason, a thrust receiving portion which one side surface of the helical gear contacts is formed close to a bearing portion of the lower housing. This thrust receiving portion is provided with an oil supply groove that supplies lubricant (hereinafter, called lubricating oil) to the thrust receiving portion.

CITATION LIST

Patent Document

Patent Document 1: Japanese Unexamined Patent Publication No. JP2016-94969

SUMMARY OF THE INVENTION

Technical Problem

However, the oil supply groove formed at the thrust receiving portion is provided so as to extend in a radial direction of the balancer shaft toward a bottom of the lower housing. Because of this, a supply amount of the lubricating oil to an opposite direction side to a rotation direction of the balancer shaft with respect to the oil supply groove of the thrust receiving portion is insufficient, then there is a risk that abrasion will occur at a part of the thrust receiving portion.

An object of the present invention is therefore to provide a balancer device that is capable of suppressing occurrence of the abrasion of the thrust receiving portion by sufficiently supplying the lubricating oil between the thrust receiving portion and the helical gear.

Solution to Problem

According to one aspect of the present invention, a balancer device comprises: a balancer shaft which is rotatably supported by a bearing portion provided in an accommodation section of the housing and to which a rotation force is transmitted from the internal combustion engine; an arc-shaped thrust receiving portion which a thrust flange portion of the balancer shaft can contact from a rotation axis direction; and a recessed portion provided at an end portion, which is located at an against side of a rotation direction of the balancer shaft, of the thrust receiving portion.

Effects of Invention

According to the present invention, it is possible to suppress occurrence of the abrasion of the thrust receiving portion.

EMBODIMENTS FOR CARRYING OUT THE INVENTION

Embodiments of a balancer device for an internal combustion engine according to the present invention will be explained below with reference to the drawings.

First Embodiment

Figure 1:
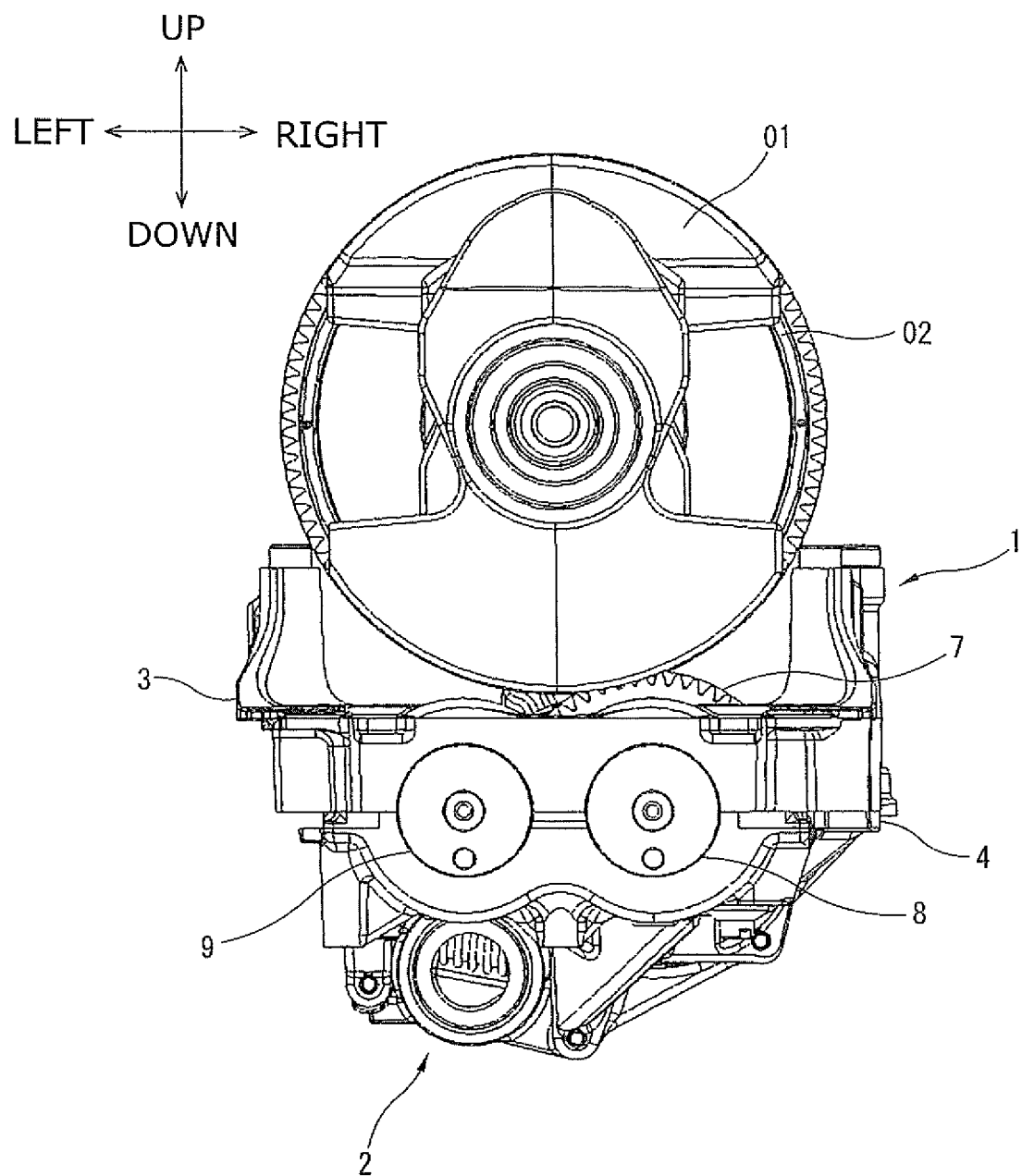
FIG. 1 is a front view showing a state in which a balancer device according to the present embodiment is mounted to a lower portion of a cylinder block of an internal combustion engine.
Figure 2:
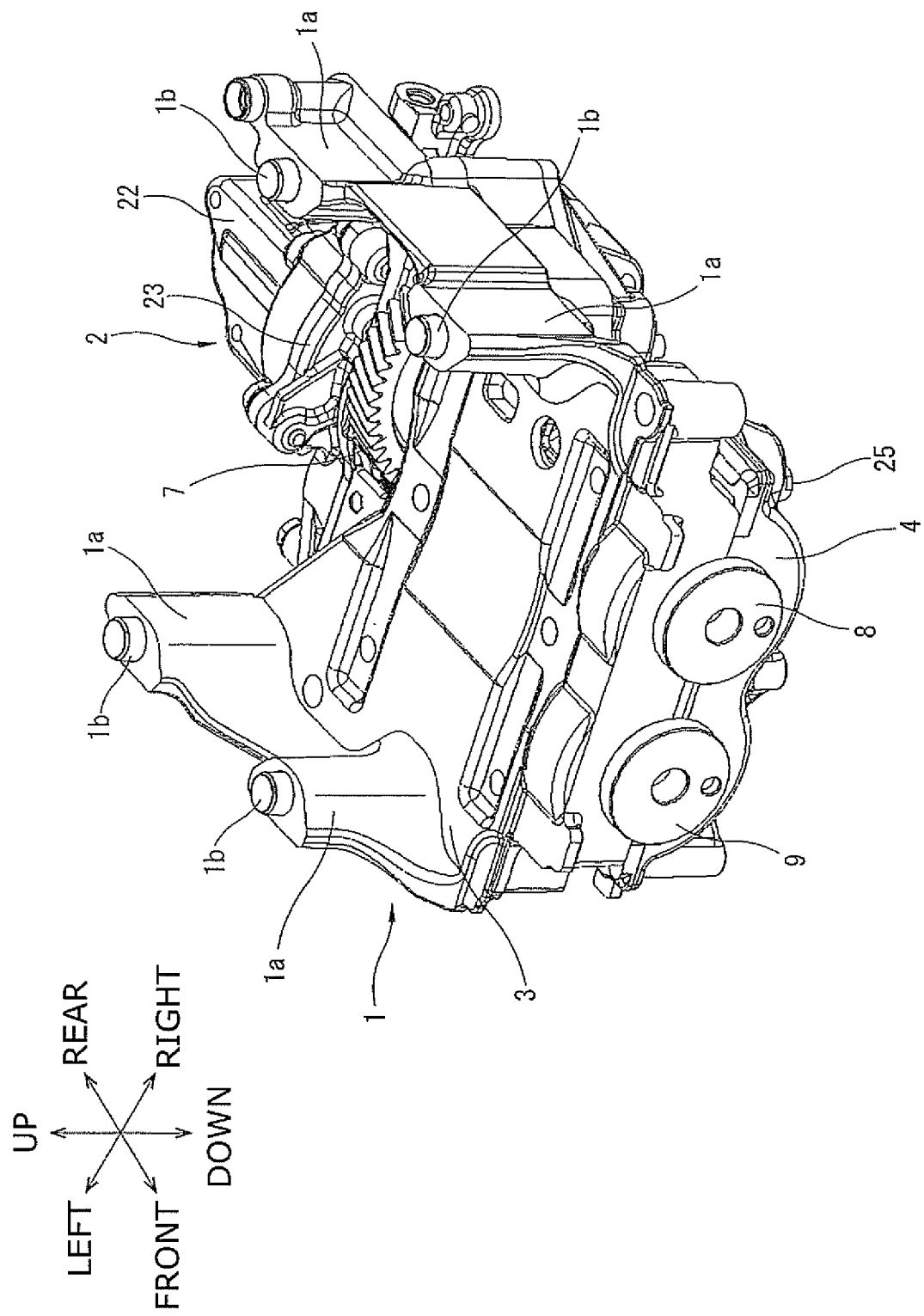
FIG. 2 is a perspective view of the balancer device of the present embodiment, viewed from a front side.
Figure 3:
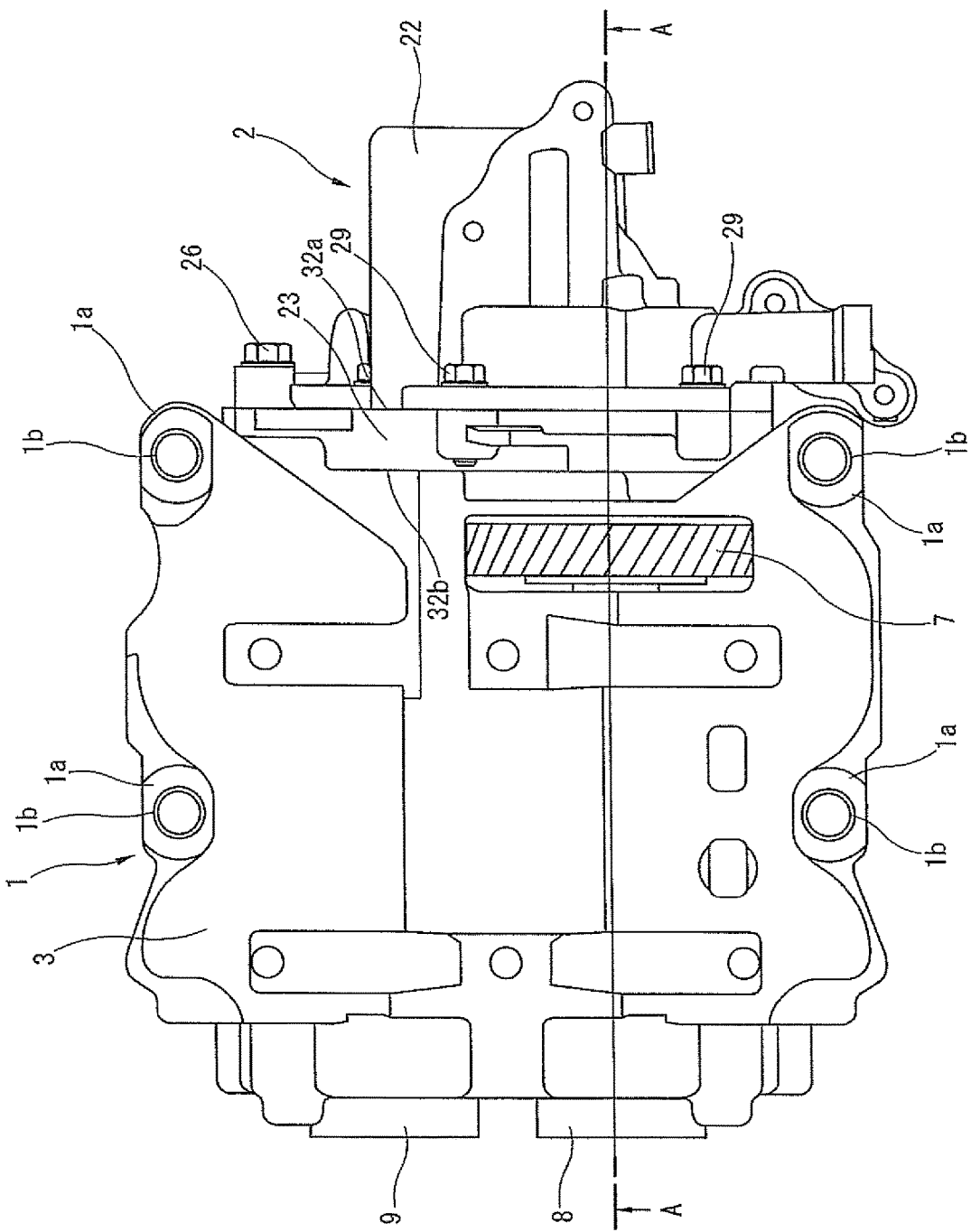
FIG. 3 is a plan view of the balancer device and an oil pump of the present embodiment.

FIG. 1 is a front view showing a state in which a balancer device according to the present embodiment is mounted to a lower portion of a cylinder block of an internal combustion engine. FIG. 2 is a perspective view of the balancer device of the present embodiment, viewed from a front side. FIG. 3 is a plan view of the balancer device and an oil pump of the present embodiment.

Figure 4:
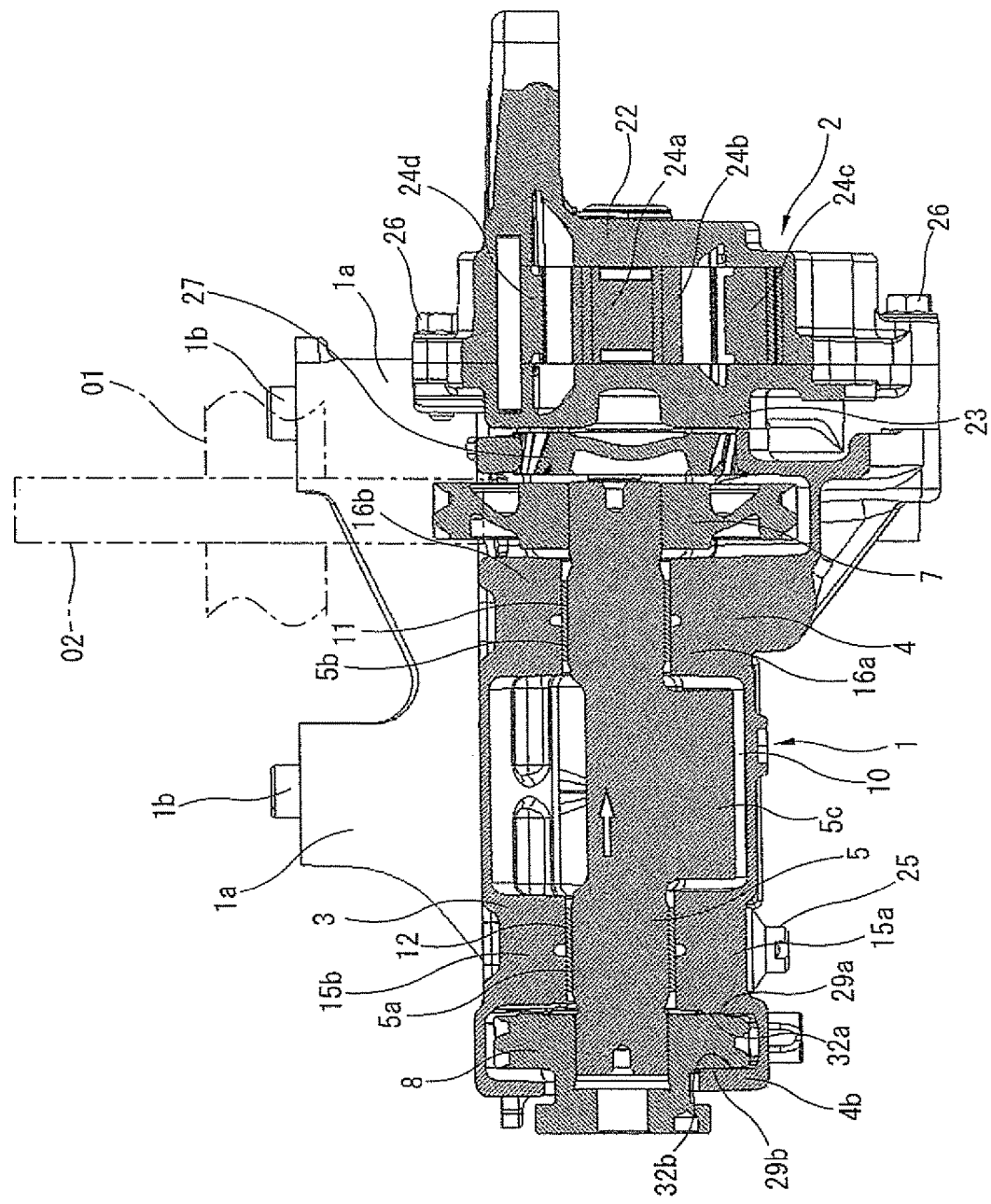
FIG. 4 is a sectional view taken along a line A-A of FIG. 3.
Figure 5:
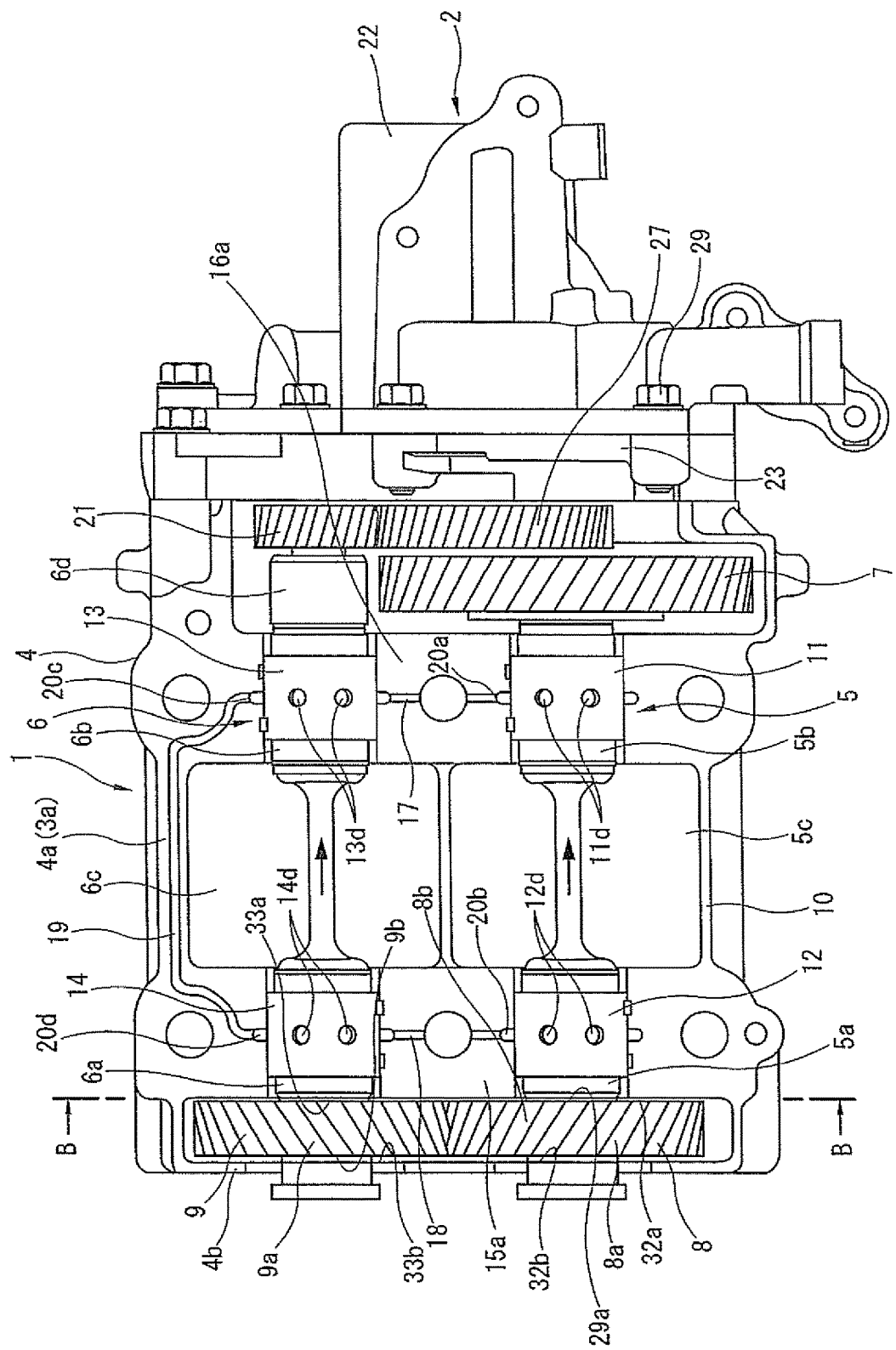
FIG. 5 is a plan view of a lower housing with an upper housing of the balancer device being removed.

FIG. 4 is a sectional view taken along a line A-A of FIG. 3. FIG. 5 is a plan view of a lower housing with an upper housing of the balancer device being removed.

In the following explanation, as each direction is indicated in FIGS. 1 and 2, an axial direction of a crankshaft of the internal combustion engine is called a front-rear direction, an axial direction of an engine body, which is orthogonal to this front-rear direction, is called an up-down direction, and a direction which is orthogonal to these two directions is called a right-left direction.

A balancer device 1 is accommodated in an oil pan (not shown) that is fixed to a lower portion of a cylinder block of the internal combustion engine (not shown, in the present embodiment, an in-line four-cylinder engine). As shown in FIG. 1, a rotation force is transmitted to the balancer device 1 from a helical type crank gear 02 provided at a crankshaft 01 supported by a bearing cap of the internal combustion engine. This balancer device 1 is integrally provided with an oil pump 2. The oil pump 2 is configured to be driven by the rotation force transmitted from the balancer device 1.

The internal combustion engine has a main oil gallery that supplies lubricant (hereinafter, called lubricating oil) to sliding parts in the internal combustion engine. As will be described later, oil stored in the oil pan (not shown) is pumped up and discharged by the oil pump 2, and is supplied to the main oil gallery through an outlet passage.

As shown in FIGS. 2 and 3, the balancer device 1 is fixed to a lower surface of the cylinder block of the internal combustion engine with four fixing bolts (not shown) as fixing members through a plurality of leg portions (in the present embodiment, four leg portions) 1a. The four leg portions 1a are formed integrally with an upper surface of an after-mentioned upper housing 3, and each of the four leg portions 1a has a positioning hollow pin 1b that protrudes upward from an upper end of the leg portion 1a.

The balancer device 1 has the upper housing 3 fixed to the lower portion in a gravity direction of the cylinder block through the four leg portions 1a and a lower housing 4 connected to an oil pan bottom side of the upper housing 3 with a plurality of connecting bolts 25 (in the present embodiment, four connecting bolts) as connecting members.

These upper and lower housings 3 and 4 are molded in aluminum alloy material as metal material. A drive shaft 5 and a driven shaft 6, which are a pair of balancer shafts arranged parallel to each other, are rotatably supported in an accommodation section 10 formed between the both housings 3 and 4. At one end port ion in a rotation axis direction of the drive shaft 5, a helical type drive gear 7 to which the rotation force is transmitted by engaging with the crank gear 02 is provided.

Here, positioning of these upper housing 3 and lower housing 4 is made by two pins (not shown).

Further, as shown in FIG. 5, a helical type drive gear 8 as a drive side reverse gear is fixed to the other end side in the rotation axis direction of the drive shaft 5 so as to be able to rotate integrally with the drive shaft 5. Moreover, a helical type driven gear 9 as a driven side reverse gear to which the rotation force is transmitted by engaging with the drive gear 8 is fixed to the driven shaft 6.

A balancer housing as a housing is formed by these upper housing 3 and lower housing 4.

The lower housing 4 is formed into a rectangular box shape that is substantially same as the upper housing 3. A rear side end surface of the lower housing 4 is a flat fixing surface to which the oil pump 2 is fixed.

As shown in FIG. 5, the drive shaft 5 is supported at a pair of journal portions 5a and 5b located at both end sides in the rotation axis direction of the drive shaft 5 by a pair of plain bearings 11 and 12 as bearing portions provided between the upper housing 3 and the lower housing 4.

When the drive shaft 5 is rotated by the drive gear 7 provided at the one end portion of the drive shaft 5, the drive shaft 5 and the driven shaft 6 rotate in opposite directions to each other at double the rotation speed of the crankshaft with the rotation of the drive shaft 5 being transmitted from the drive gear 8 fixed to the other end side of the drive shaft 5 to the driven shaft 6 through the driven gear 9 fixed to the driven shaft 6.

Further, a counter weight 5c is formed integrally with the drive shaft 5 in the rotation axis direction between the pair of journal portions 5a and 5b.

In the same manner as the drive shaft 5, the driven shaft 6 is supported at a pair of journal portions 6a and 6b formed at both end sides in a rotation axis direction of the driven shaft 6 by a pair of plain bearings 13 and 14 as bearing portions provided between the upper housing 3 and the lower housing 4. Further, a counter weight 6c is formed integrally with the driven shaft 6 in the rotation axis direction between the pair of journal portions 6a and 6b.

As shown in FIGS. 4 and 5, each of the plain bearings 11 to 14 is formed into a pair of half-cut arc shapes at the both housing 3 and 4 sides, and has a cylindrical shape as a whole by coupling these half-cut arc portions at their opposing end portions. Further, the half-cut arc portions of the plain bearings 11 to 14 are placed in arc-shaped bearing grooves formed on opposing surfaces of a pair of upper and lower partition walls 15a, 15b, 16a and 16b provided between the upper housing 3 and the lower housing 4.

As shown in FIG. 5, passage grooves 17 and 18 to supply lubricating oil to each of the plain bearings 11 to 14 are formed on the opposing surfaces of the partition walls 15a, 15b, 16a and 16b.

These passage grooves 17 and 18 are connected to each other through one communication groove 19 that is formed on opposing surfaces of wall portions 3a and 4a connecting the partition walls 15 and 16 of the both housings 3 and 4. In FIG. 5, only the passage grooves 17 and 18 and the communication groove 19 on the lower housing 4 side are illustrated.

One ends and the other ends of the passage grooves 17 and 18 open to annular grooves 20a, 20b, 20c and 20d which are formed on inner circumferential surfaces of the bearing grooves. Each of the annular grooves 20a to 20d is formed at the substantially middle in a width direction of the inner circumferential surface of the bearing groove. The other ends of the passage grooves 17 and 18 are connected to the communication groove 19 through the annular grooves. Regarding these passage grooves 17 and 18 and communication groove 19, in a state in which the both upper and lower housing 3 and 4 are connected together from up-and-down directions with the connecting bolts 25, a passage is formed on opposing surfaces of the upper housing 3 and the lower housing 4.

The plain bearings 11 to 14 are provided, at predetermined positions on circumferential walls thereof, with communication openings 1id, 12d, 13d and 14d which communicate with the annular grooves 20a to 20d respectively. Each of the plain bearings 11 to 14 has four communication openings on the same circumference line at the substantially middle in a width direction of the plain bearing. Oil is introduced into gaps between inner circumferential surfaces of the plain bearings 11 to 14 and outer circumferential surfaces of the journal portions 5a to 6b through these communication openings 11d, 12d, 13d and 14d.

Further, a drive helical gear 21, as an external gear, which has a smaller diameter than that of the driven gear 9, is fixed to one end portion 6d in the rotation axis direction of the driven shaft 6. This drive helical gear 21 drives the oil pump 2.

The oil pump 2 is a typical variable displacement vane pump. Therefore, its structure will be simply explained with reference to FIG. 4. A pump housing is fixed to the fixing surfaces of the upper housing 3 and the lower housing 4 of the balancer device 1 with a plurality of bolts 26 (in the present embodiment, four bolts) as fixing members. This pump housing is formed by a housing body 22 made of metal material such as aluminium alloy material and a cover member 23 made of aluminium alloy material.

One end side of the housing body 22 is open, and a pump accommodation chamber having a square bracket shape in a longitudinal cross section is formed in the housing body 22. The cover member 23 is connected to the housing body 22 so as to cover an opening of the housing body 22.

The oil pump 2 has a pump shaft 24a, a rotor 24b and vanes 24c in the pump accommodation chamber. The pump shaft 24a is set at a substantially center portion of the pump accommodation chamber, and is rotatably supported by the housing body 22 and the cover member 23 with both end portions in a rotation axis direction of the pump shaft 24a penetrating the housing body 22 and the cover member 23 respectively. Further, a driven side helical gear 27 that is engaged with the drive helical gear 21 is fixed to one end portion in the rotation axis direction of the pump shaft 24a.

The rotor 24b is rotatgably accommodated in the pump accommodation chamber. The rotor 24b is connected to the pump shaft 24a with its center portion fitted on or engaged with the pump shaft 24a by spline engagement. The vanes 24c are accommodated in a plurality of slots (for instance, seven slots), which are radially formed at an outer circumferential portion of the rotor 24b by being cut radially, so as to be able to extend from and retract into the slots.

The oil pump 2 further has a cam ring 24d, a coil spring (not shown) as a forcing member and a pair of vane rings. The cam ring 24d is formed into a ring shape having a circular hole in its inner circumference. This hole of the cam ring 24d is formed so as to contact an outer peripheral side of each vane 24c.

Figure 6:
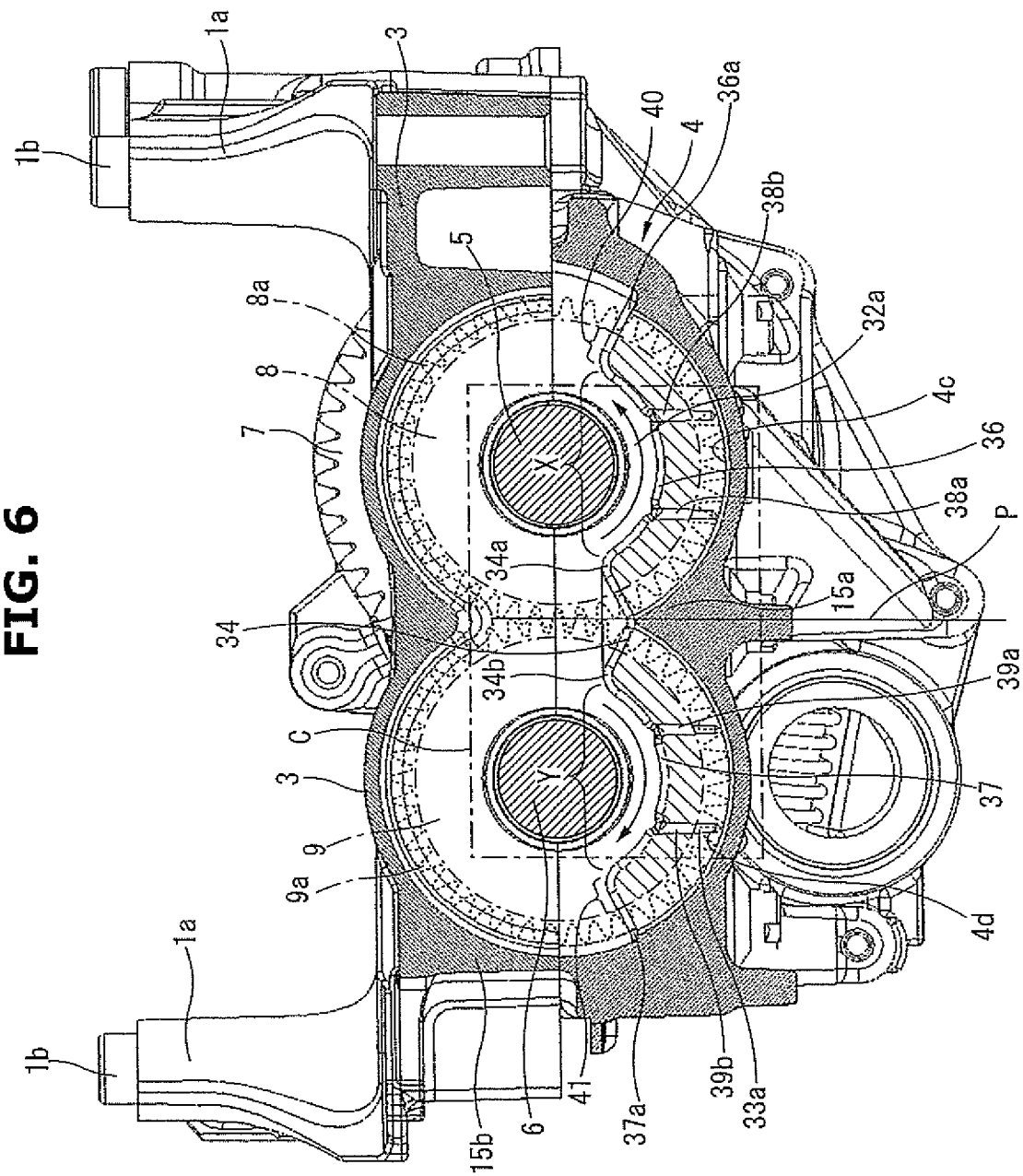
FIG. 6 is a sectional view taken along a line B-B of FIG. 5.
Figure 7:
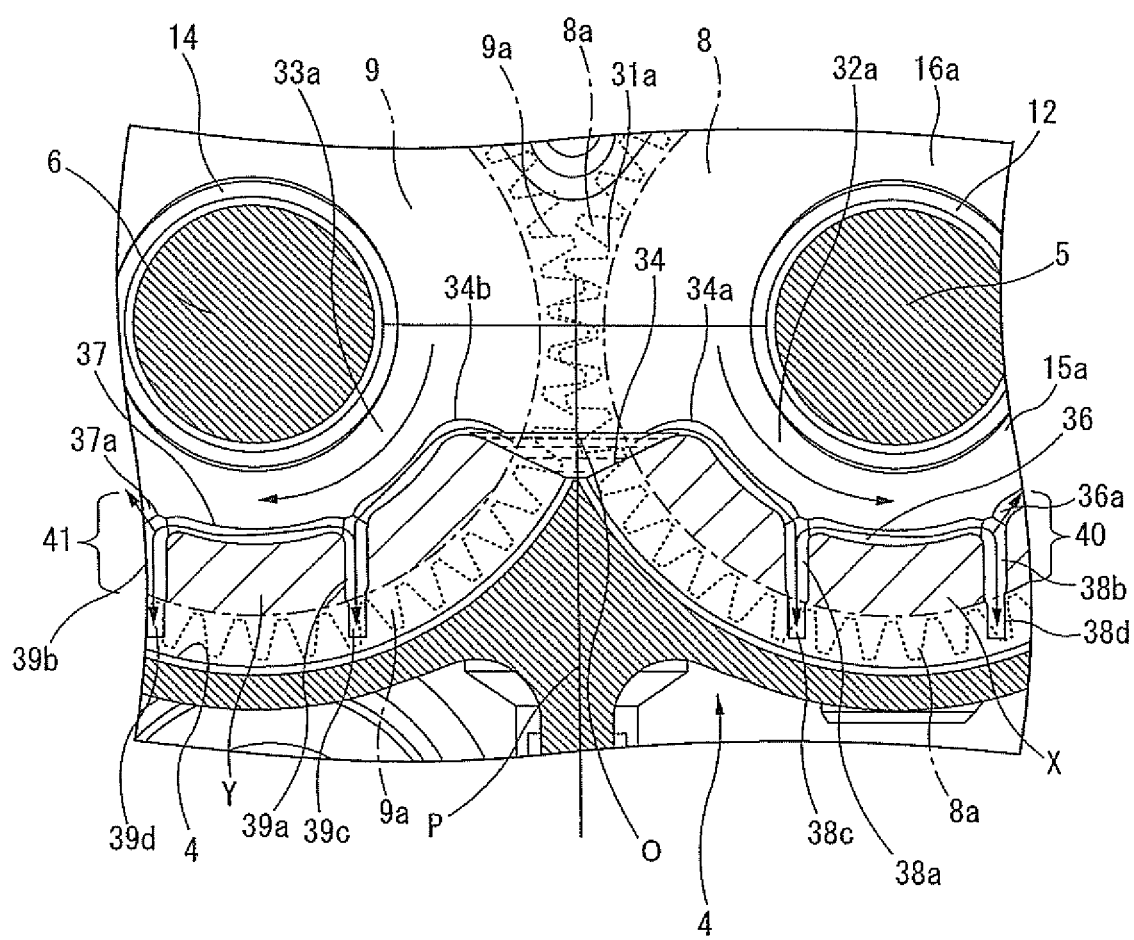
FIG. 7 is an enlarged view of an area C of FIG. 6.
Figure 8:
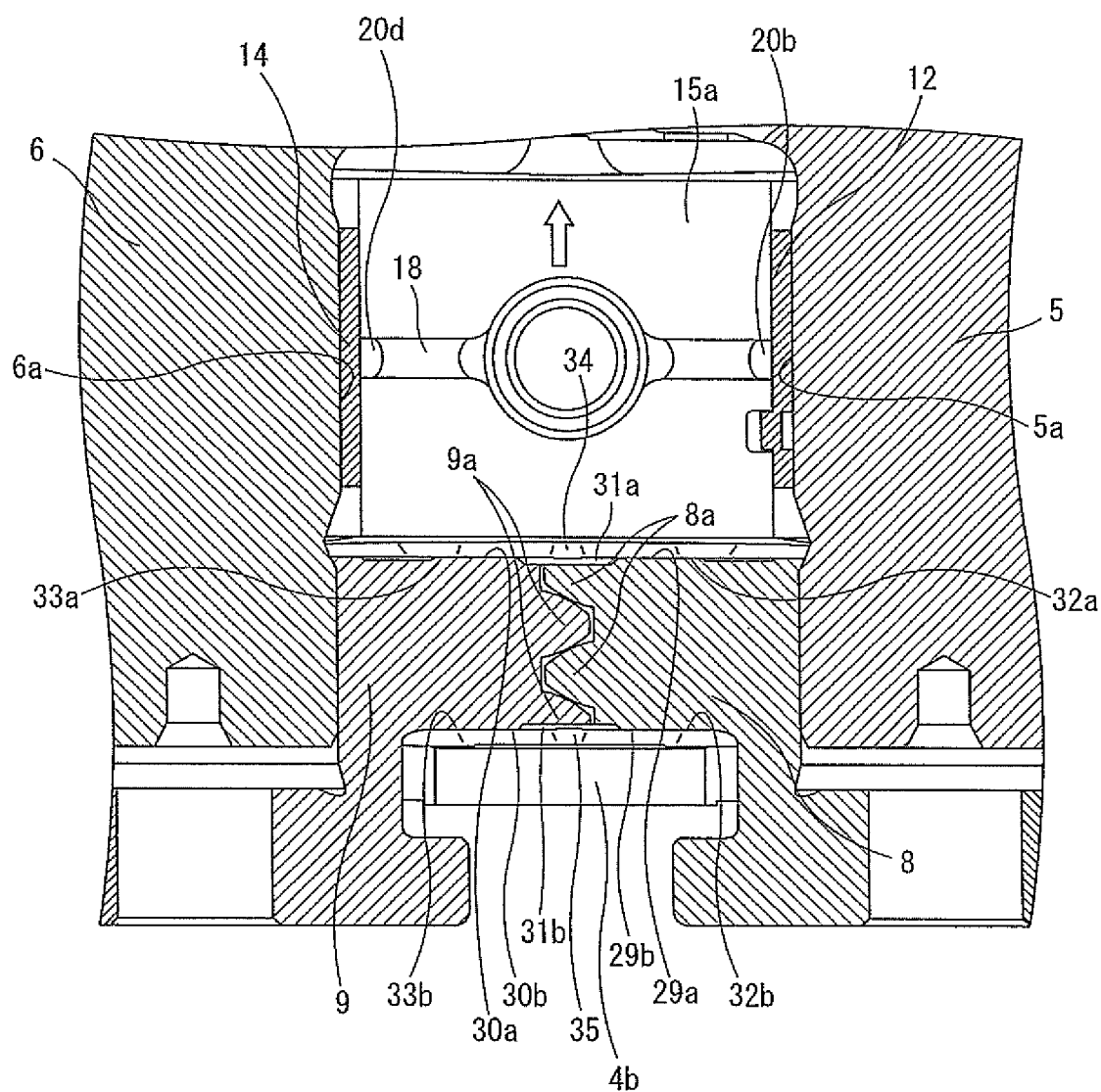
FIG. 8 is a sectional view taken along a line D-D of FIG. 6.

FIG. 6 is a sectional view taken along a line B-B of FIG. 5. FIG. 7 is an enlarged view of an area C of FIG. 6. FIG. 8 is a sectional view taken along a line D-D of FIG. 6.

As shown in FIGS. 4, 5 and 8, helical teeth 8a and 9a are formed integrally with outer circumferences of the drive and driven gears 8 and 9 respectively. Further, the drive gear 8 and the driven gear 9 are provided with first and second thrust flange portions 29a, 29b, 30a and 30b on both side surfaces in each rotation axis direction of the drive and driven gears 8 and 9.

The first and second thrust flange portions 29a to 30b are formed flat on one side surfaces, facing to an outer side surface (after-mentioned thrust receiving portions 32a and 33a) of the partition wall 15a, of the drive and driven gears 8 and 9 and on the other side surfaces, facing to an inner side surface (after-mentioned thrust receiving portions 32b and 33b) of a front end wall 4b of the lower housing 4, of the drive and driven gears 8 and 9.

Each of the first and second thrust flange portions 29a to 30b has an annular shape. These first and second thrust flange portions 29a to 30b are formed simultaneously with molding of each of the drive and driven gears 8 and 9.

Further, ring-shaped stepped recesses 31a and 31b are formed at outer circumferential sides of the first and second thrust flange portions 29a to 30b. These stepped recesses 31a and 31b are formed on both side surfaces of the helical teeth 8a and 9a provided at the outer circumferential sides of the first and second thrust flange portions 29a to 30b of the drive and driven gears 8 and 9. Therefore, by the stepped recesses 31a and 31b, each of the drive and driven gears 8 and 9 does not contact the opposing outer side surface of the partition wall 15a and does not contact the opposing inner side surface of the front end wall 4b. The stepped recesses 31a and 31b are formed so that depths of their recesses are greater than a clearance width between the thrust receiving portions 32a to 33b and the thrust flange portions 29a to 30b.

On the other hand, on the outer side surface of the partition wall 15a and on the inner side surface of the front end wall 4b at the lower housing 4 side, as shown in FIGS. 6 to 8, the thrust receiving portions 32a, 32b, 33a and 33b to which the thrust flange portions 29a, 29b, 30a and 30b of the drive and driven gears 8 and 9 can contact respectively are formed integrally with the respective partition wall 15a and front end wall 4b.

Each of these thrust receiving portions 32a to 33b has a flat arc shape that corresponds to the thrust flange portions 29a to 30b. That is, the thrust receiving portions 32a to 33b are formed into the substantially same arc shape as an entire shape of the thrust flange portions 29a to 30b, so that the thrust flange portions 29a to 30b can contact the thrust receiving portions 32a to 33b respectively.

That is to say, the rotation force is transmitted to the drive shaft 5 from the crank gear 02 through the drive gear 7, and the drive gear 8 and the driven gear 9 rotate while engaging with each other. Then, as shown by arrow directions in FIGS. 4 and 8, a thrust load to a right direction in FIG. 4 acts on the drive shaft 5 and the driven shaft 6. Due to this thrust load, the thrust flange portions 29a and 30a of the drive and driven gears 8 and 9 rotate while being in sliding contact with the thrust receiving portions 32a and 33a respectively from the rotation axis directions of the drive and driven shafts 5 and 6.

Here, when a rotation change of the drive and driven shafts 5 and 6 occurs, a thrust load whose direction is opposite to the arrow directions of FIGS. 4 and 8 occurs, then the opposite side thrust flange portions 29b and 30b of the drive and driven gears 8 and 9 rotate while being in sliding contact with the thrust receiving portions 32b and 33b respectively.

At a middle position in a transverse direction of the thrust receiving portions 32a to 33b (in a width direction of the lower housing 4), first and second oil storing grooves 34 and 35 as hollow portions (recessed portions) are formed. Further, at both sides of these first and second oil storing grooves 34 and 35 (in the width direction of the lower housing 4), a pair of first groove passages 36 and 37 that extend from both end portions 34a and 34b, located at the drive and driven shafts 5 and 6 sides, of the first oil storing groove 34 and also second groove passages (not shown) are formed.

In the following description, configuration or structure of the first oil storing groove 34 and the pair of first groove passages 36 and 37 provided at the outer side surface side of the partition wall 15a will be explained with reference to mainly FIGS. 6 and 7.

The first oil storing groove 34 and the first groove passages 36 and 37 are formed by using steps between the thrust receiving portions 32a and 33a and a pair of protuberances 40 and 41 that are formed at the thrust receiving portions 32a and 33a.

Both the protuberances 40 and 41 are each formed into an arc band shape along substantially arc shaped inner bottom surfaces 4c and 4d of the lower housing 4. That is, lower circumferential edges (lower sides in FIGS. 6 and 7) of the protuberances 40 and 41 are formed close to and along the inner bottom surfaces 4c and 4d of the lower housing 4. On the other hand, upper circumferential edges (upper sides in FIGS. 6 and 7) of the protuberances 40 and 41 are formed close to lower halves in radial directions of the rotation axes of the drive and driven gears 8 and 9. Therefore, the protuberances 40 and 41 are formed into the arc band shape, and their surfaces are formed into a flat surface.

A middle portion where the both protuberances 40 and 41 are connected to each other is formed into a substantially V-shape. Step portions of the upper circumferential edges of the protuberances 40 and 41, which are between the thrust receiving portions 32a and 33a and the protuberances 40 and 41, are formed into a long narrow chamfered tapered surface. Each of the arc band-shaped protuberances 40 and 41 is formed so that an amount of protuberance from the flat surfaces of the thrust receiving portions 32a and 33a is about a few mm (millimeters). This amount of protuberance can be arbitrarily changed.

The protuberances 40 and 41 are formed simultaneously with forming of the lower housing 4, for instance, by casting. Or, the protuberances 40 and 41 are formed by machining a part of each of the thrust receiving portions 32a to 33b after molding the thrust receiving portions 32a to 33b by casting. Further, the protuberances 40 and 41 could be formed by remaining portions after cutting the thrust receiving portions 32a to 33b by cutting process.

Then, the first oil storing groove 34 is formed at the step portion between the connecting portion of the upper circumferential edges of the protuberances 40 and 41 and the thrust receiving portions 32a and 33a.

More specifically, the first oil storing groove 34 is formed at a lower side with respect to a meshing portion of the helical teeth 8a and 9a of the drive gear 8 and the driven gear 9 at the thrust receiving portions 32a and 33a. That is, the first oil storing groove 34 is formed against rotation directions (in arrow directions in FIG. 6) of the meshing drive and driven gears 8 and 9 at the lower side with respect to the meshing portion at which the mesh of the drive and driven gears 8 and 9 is released.

This first oil storing groove 34 is shaped into a V-shape that opens to right and left sides, and opens toward the meshing portion of the drive and driven gears 8 and 9 which is an upper side in a vertical direction. Further, the first oil storing groove 34 is symmetric with respect to a vertical line P that passes through a center of the meshing portion of the drive and driven gears 8 and 9. The first oil storing groove 34 communicates with the pair of first groove passages 36 and 37 extending from the both end portions 34a and 34b, located at the drive and driven shafts 5 and 6 sides, of the first oil storing groove 34.

The both groove passages 36 and 37 are formed at the step portions between the upper circumferential edges of the protuberances 40 and 41 and the thrust receiving portions 32a and 33a.

The groove passages 36 and 37 are formed into an arc shape and have a long length along circumferential directions of the drive and driven shafts 5 and 6 at lower sides in a gravity direction of the drive and driven shafts 5 and 6. The groove passages 36 and 37 are located at substantially middle positions between the drive and driven shafts 5 and 6 and the helical teeth 8a and 9a of the drive and driven gears 8 and 9 respectively.

Inner side end portions of the groove passages 36 and 37 communicate with the both end portions 34a and 34b of the first oil storing groove 34 respectively, whereas outer side end portions 36a and 37a of the groove passages 36 and 37 open to an inside of the lower housing 4.

As shown in FIG. 6, these outer side end portions 36a and 37a are formed into a substantially reversed V-shape, and communicate with respective spatial portions between a peripheral wall inner surface of the lower housing 4 and tooth tips of the helical teeth 8a and 9a of the drive and driven gears 8 and 9.

Further, the groove passages 36 and 37 are provided, at some points of the groove passages 36 and 37, with a pair of vertical groove passages 38a and 38b and a pair of vertical groove passages 39a and 39b (four vertical groove passages in total) respectively, each of which extends linearly in an up-down direction in the gravity direction of the thrust receiving portions 32a and 33a.

A distance of separate positions between the one side vertical groove passages 38a and 38b located at a right side in FIGS. 6 and 7 is substantially the same as an outside diameter of the drive shaft 5. A distance of separate positions between the other side vertical groove passages 39a and 39b located at a left side in FIGS. 6 and 7 is substantially the same as an outside diameter of the driven shaft 6.

Upper end edges of the vertical groove passages 38a to 39b are formed so as to open to the groove passages 36 and 37, whereas lower end edges 38c, 38d, 39c and 39d of the vertical groove passages 38a to 39b do not open but are closed.

Then, the lubricating oil discharged to the outlet passage of the oil pump 2 is supplied between the thrust receiving portions 32a and 33a and the thrust flange portions 29a and 30a.

That is, the lubricating oil discharged to the outlet passage flows or reaches to each bearing groove through the passage grooves 17 and 18, the communication groove 19 and the annular grooves 20a to 20d. The lubricating oil is then forcefully supplied between the thrust receiving portions 32a and 33a and the thrust flange portions 29a and 30a. In particular, the lubricating oil is directly supplied between the first thrust receiving portions 32a and 33a and the first thrust flange portions 29a and 30a from each bearing groove. The lubricating oil discharged from the oil pump 2 could be supplied to the communication groove 19 through a branch oil passage that branches off from an oil passage connected to the main oil gallery provided at the cylinder block or through a communication passage formed between the upper housing 3 and the lower housing 4 after passing through the main oil gallery.

Although the configuration of the first oil storing groove 34 etc. at the first thrust receiving portions 32a and 33a side has been explained above, configuration of the second oil storing groove 35 etc. at the second thrust receiving portions 32b and 33b side shown in FIG. 8 is the same. That is, the same structure such as the second groove passage and the vertical groove passage is formed also at the second thrust receiving portions 32b and 33b side.

The lubricating oil discharged from the oil pump 2 is supplied to the communication groove 19 through oil passages (not shown) formed inside the pump housing and inside the upper housing 3 of the balancer device 1.

[Working and Effect of the Present Embodiment]

Operation of the balancer device 1 and the oil pump 2 (the variable displacement pump) will be briefly explained below.

In a low rotation operating condition from an engine start, the drive shaft 5 receives the rotation force of the crankshaft, and the driven shaft 6 is driven and rotated through the drive gear 8 and the driven gear 9. The rotation force is then transmitted from the drive helical gear 21 of the driven shaft 6 to the driven side helical gear 27 of the pump shaft 24a.

The pump shaft 24a is then driven and rotated, and the oil pump 2 performs the pump operation by the pump elements, and the lubricating oil is discharged from an outlet port to the outlet passage. The lubricating oil is then supplied to the main oil gallery, and also supplied to the communication groove 19 through the communication passage formed between the oil pump 2 and the balancer device 1. Further, the lubricating oil flows into the annular grooves 20a, 20b, 20c and 20d through the passage grooves 17 and 18, and lubricates the inner and outer circumferential surfaces of the plain bearings 11 to 14.

The lubricating oil having lubricated each of the plain bearings 11 to 14 is supplied between the first thrust receiving portions 32a and 33a and the thrust flange portions 29a and 30a of the drive and driven gears 8 and 9.

With this oil supply, the first thrust receiving portions 32a and 33a and the thrust flange portions 29a and 30a are lubricated. The lubricating oil is further supplied between the helical teeth 8a and 9a of the drive and driven side helical gears 8 and 9, then the helical teeth 8a and 9a are lubricated.

At the same time, the lubricating oil having passed through the helical teeth 8a and 9a and the stepped recesses 31a and 31b flows in the first and second oil storing grooves 34 and 35 and is held once in these oil storing grooves 34 and 35. That is, the lubricating oil is stored once in each of the oil storing grooves 34 and 35 and on the flat thrust flange portions 29a to 30b.

The lubricating oil stored in the oil storing grooves 34 and 35 and on the thrust flange portions 29a to 30b flows in the groove passages 36 and 37 from the both end portions 34a and 34b of the first and second oil storing grooves 34 and 35. Thanks to the large arc shape toward the lower side in the gravity direction of the groove passages 36 and 37 and the reversed V-shape of the outer side end portions 36a and 37a, the lubricating oil flowing in the groove passages 36 and 37 is temporarily held in the groove passages 36 and 37 while flowing between the groove passages 36 and 37 and the thrust flange portions 29a to 30b.

The lubricating oil flowing to these portions flows into the vertical groove passages 38a to 39b. Since downstream ends of the vertical groove passages 38a to 39b are closed, the lubricating oil is temporarily held also in these vertical groove passages 38a to 39b.

Therefore, the lubricating oil stored or held in the first and second oil storing grooves 34 and 35, the groove passages 36 and 37 and the vertical groove passages 38a to 39b gradually flows or falls downward in the gravity direction from these portions. That is, as shown in FIG. 6, by and according to the rotation of the drive and driven gears 8 and 9, lubricating oil film forming areas X and Y (thin oblique line areas) are formed at the lower side in the gravity direction. These lubricating oil film forming areas X and Y are formed at a radial direction lower side with respect to the first oil storing groove 34 and the groove passages 36 and 37 in the drawing.

Then, the thrust load shown by arrows in FIG. 5 occurs at the drive shaft 5 and the driven shaft 6 by and according to the rotation of the drive and driven gears 8 and 9. Due to this thrust load, although the thrust flange portions 29a and 30a make sliding contact with the thrust receiving portions 32a and 33a from each rotation axis direction while being pressed against the thrust receiving portions 32a and 33a respectively, these sliding portions are adequately lubricated in the lubricating oil film forming areas X and Y.

Hence, occurrence of abrasion of the thrust receiving portions 32a and 33a at the lower side position with respect to the meshing portion of the drive and driven gears 8 and 9 in the rotation directions of the drive and driven gears 8 and 9 is suppressed.

A rotation direction area of the drive and driven gears 8 and 9 from a position close to the meshing portion of these drive and driven gears 8 and 9 is an area where the abrasion tends to occur. Therefore, an abrasion reduction effect of these portions is greater, then durability can be increased.

In particular, the first and second oil storing grooves 34 and 35, the groove passages 36 and 37 and the vertical groove passages 38a to 39b have the function of temporarily holding the lubricating oil. Therefore, a lubricating state of the thrust receiving portions 32a and 33a in the lubricating oil film forming areas X and Y is adequately maintained, then a lubricating performance is further increased.

Further, the lubricating oil that adheres to the meshing portion of the drive and driven gears 8 and 9 can be supplied to the first and second oil storing grooves 34 and 35 by a gear pump operation of the drive and driven gears 8 and 9. Therefore, the first and second oil storing grooves 34 and 35 can be effectively supplied with the lubricating oil.

Since the lubricating oil is stored on the inner bottom surfaces 4c and 4d side of the accommodation section 10 of the lower housing 4, the lubricating oil is spread or sprinkled over by and according to the rotation of the drive and driven gears 8 and 9, thereby supplying the sufficient lubricating oil to the meshing portion of the drive and driven gears 8 and 9 and the first and second oil storing grooves 34 and 35.

In addition, by forming the first oil storing groove 34 into the V-shape, each area of the thrust receiving portions 32a and 33a can be sufficiently secured. A surface pressure of each of the thrust flange portions 29a and 30a, which acts on the thrust receiving portions 32a and 33a, can therefore be reduced to a minimum.

The second thrust receiving portions 32b and 33b also have the same structured second oil storing groove 35, groove passages 36 and 37 and vertical groove passages 38a to 39b. Therefore, similar lubricating oil film forming areas X and Y are formed. With this, even if a large load in a reverse thrust direction acts on the second thrust receiving portions 32b and 33b, it is possible to suppress an occurrence of abrasion of the second thrust receiving portions 32b and 33b.

Since viscosity of the lubricating oil is high after the engine start and in the low rotation operating condition, there is a tendency for the lubricating oil to be held or stored in the first and second oil storing grooves 34 and 35, the groove passages 36 and 37 and the vertical groove passages 38a to 39b. On the other hand, in a high rotation operating condition, the viscosity of the lubricating oil becomes low, and this reduces the tendency for the lubricating oil to be held or stored in the first and second oil storing grooves 34 and 35 etc. Rotational resistance of each of the drive shaft 5 and the driven shaft 6 is thus reduced by this low viscosity.

However, lubricating performance of the thrust receiving portions 32a to 33b is still secured properly.

The groove passages 36 and 37 can also collect the lubricating oil that flows or falls downward from upper side in the gravity direction of the groove passages 36 and 37 through the thrust receiving portions 32a to 33b during rotation of the drive and driven gears 8 and 9, besides collecting the lubricating oil from the first and second oil storing grooves 34 and 35. It is therefore possible to secure the lubricating performance over a wide area.

Further, since the stepped recesses 31a and 31b are formed between the drive and driven gears 8 and 9, the lubricating oil flowing into the stepped recesses 31a and 31b from the gravity direction upper side flows once into the first and second oil storing grooves 34 and 35. However, most of this lubricating oil and contaminant such as metal wear particles contained in the lubricating oil flow or fall downward from gaps between the stepped recesses 31a and 31b and the first and second oil storing grooves 34 and 35, and flow or fall on the inner bottom surfaces 4c and 4d of the lower housing 4. This can suppress inflow of the contaminant between the thrust receiving portions 32a to 33b and the thrust flange portions 29a to 30b.

Furthermore, since the helical teeth 8a and 9a, each surface area of which is larger than that of a spur gear, are used as the drive gear 8 and the driven gear 9, drive noise can be small.

Second Embodiment

Figure 9:
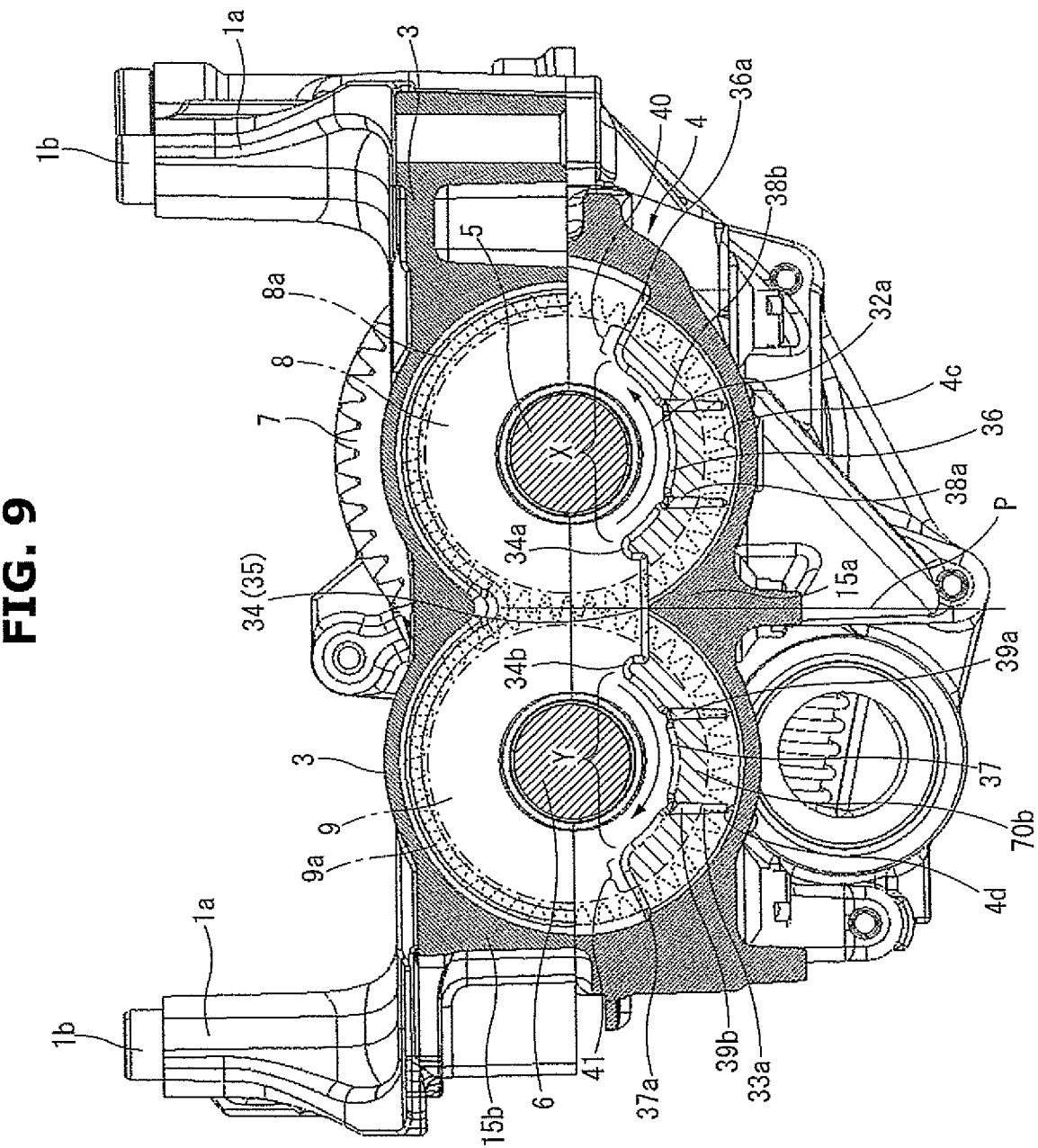
FIG. 9 is a second embodiment of the present invention, showing a sectional view taken along the line B-B of FIG. 5.

FIG. 9 shows a second embodiment of the present invention in which a shape of each of the first and second oil storing grooves 34 and 35 formed at the first and second thrust receiving portions 32a to 33b is a rectangular shape viewed from each rotation axis direction of the drive and driven shafts 5 and 6.

That is, each of the first and second oil storing grooves 34 and 35 is located at the gravity direction lower side with respect to the meshing portion of the drive and driven gears 8 and 9. Further, each of the first and second oil storing grooves 34 and 35 is shaped into the rectangular shape that extends to right and left sides with a vertical line P that passes through a center of the both drive and driven gears 8 and 9 being a center. With this structure, a volume of each of the oil storing grooves 34 and 35 is greater than that of the first embodiment. Other configurations or structures of the groove passages 36 and 37 and the vertical groove passages 38a to 39b etc. are the same as those of the first embodiment.

Therefore, according to the present embodiment, since the volumes of the oil storing grooves 34 and 35 are greater, plenty of lubricating oil can be held or stored. It is consequently possible to increase the lubricating performance around the oil storing grooves 34 and 35. Also, since a supply amount of the lubricating oil to the groove passages 36 and 37 and the vertical groove passages 38a to 39b is increased, the lubricating performance in the lubricating oil film forming areas X and Y can be further increased.

Third Embodiment

Figure 10:
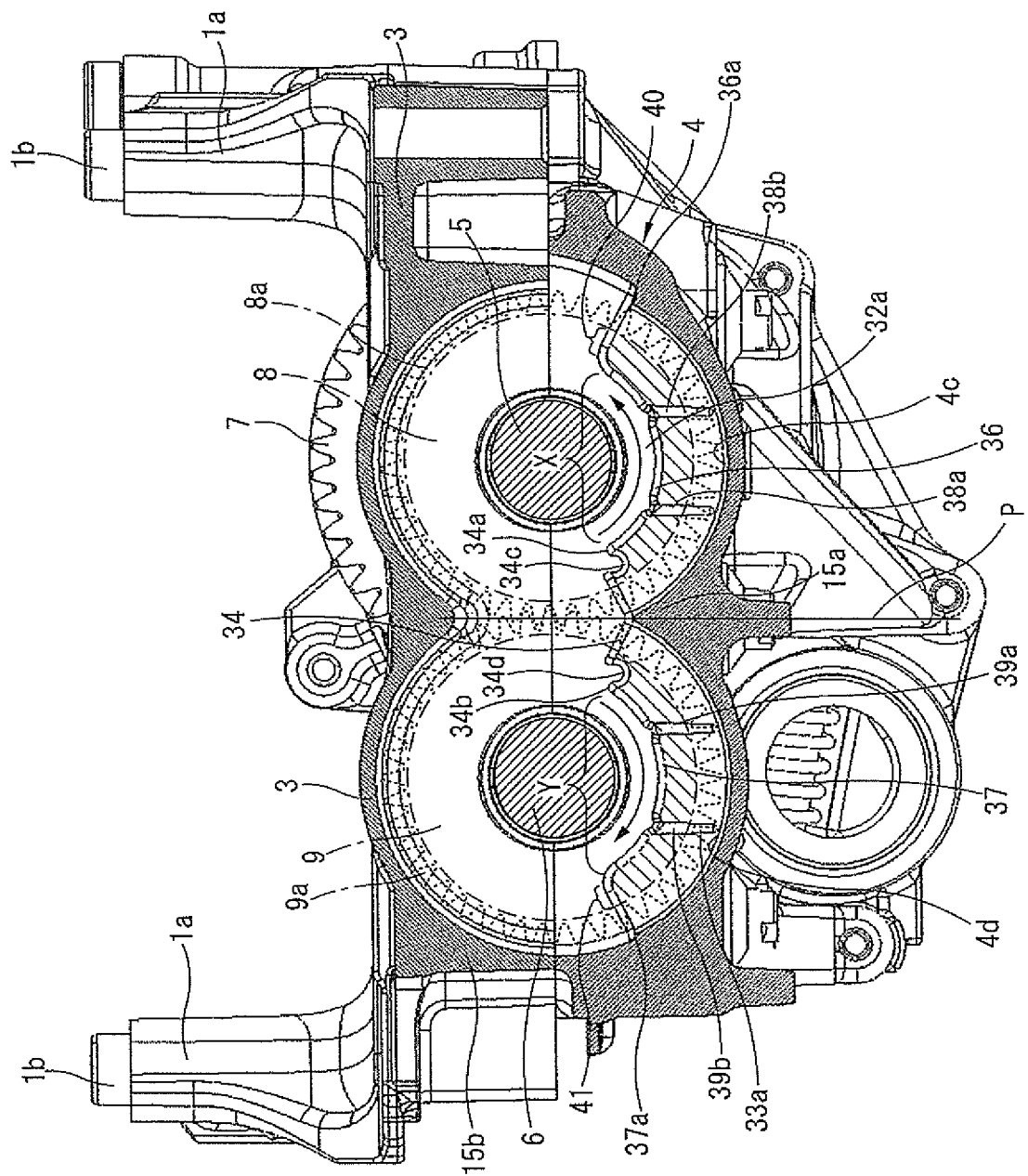
FIG. 10 is a third embodiment of the present invention, showing a sectional view taken along the line B-B of FIG. 5.

FIG. 10 shows a third embodiment of the present invention in which although basic configurations or structures are the same as those of the first embodiment, a shape of each of the first and second oil storing grooves 34 and 35 is further changed.

That is, when explaining this with reference to the drawing, the first oil storing groove 34 has a pair of storing portions 34c and 34d at the both end portions 34a and 34b, located at the drive and driven shafts 5 and 6 sides, of the first oil storing groove 34. These storing portions 34c and 34d are formed by bending or curving each tip end side of the reversed V-shaped both end portions 34a and 34b into a U-shape toward a gravity direction downward side. Further, the storing portions 34c and 34d are formed so as to connect the first oil storing groove 34 and the groove passages 36 and 37.

Therefore, when the lubricating oil having flowed into the first oil storing groove 34 flows in the groove passages 36 and 37 from the first oil storing groove 34, the lubricating oil flows in the storing portions 34c and 34d and is held or stored once in these storing portions 34c and 34d. As a consequence, a high holding performance of the lubricating oil is secured, and the lubricating performance around the storing portions 34c and 34d is further increased.

Fourth Embodiment

Figure 11:
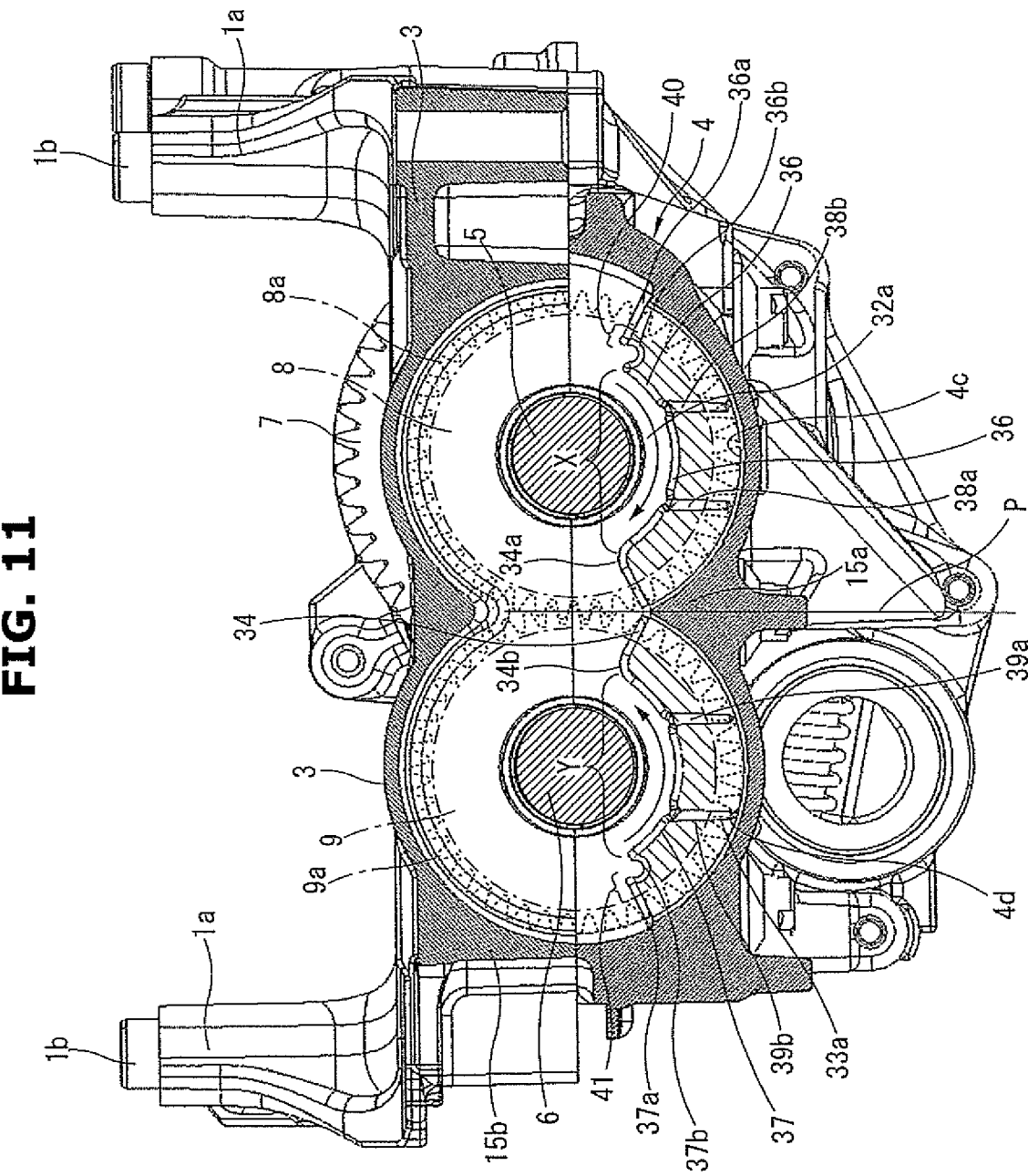
FIG. 11 is a fourth embodiment of the present invention, showing a sectional view taken along the line B-B of FIG. 5.

FIG. 11 shows a fourth embodiment of the present invention. In the present embodiment, although basic configurations or structures of the oil storing grooves 34 and 35 etc. are the same as those of the first embodiment, as a different point, rotation directions of the drive gear 8 (the drive shaft 5) and the driven gear 9 (the driven shaft 6) are opposite to those of the first embodiment. Further, a pair of storing portions 36b and 37b are formed at bending portions of the reversed V-shaped outer side end portions 36a and 37a of the groove passages 36 and 37 respectively.

These storing portions 36b and 37b are formed by bending or curving each tip end side of the reversed V-shaped outer side end portions 36a and 37a into a U-shape toward a gravity direction downward side. Further, the storing portions 36b and 37b are formed so as to continue to the groove passages 36 and 37 respectively.

The second thrust receiving portions 32b and 33b side also has the same configuration or structure.

Therefore, first, the lubricating oil that adheres to both side surfaces (in the drawing, one side surface) of the drive and driven gears 8 and 9 by and according to the rotations in arrow directions of the drive and driven gears 8 and 9 flows in the storing portions 36b and 37b. Subsequently, the lubricating oil flows into the groove passages 36 and 37 and also flows into the first oil storing groove 34. The lubricating oil flowing into the groove passages 36 and 37 and the first oil storing groove 34 is held once in these groove passages 36 and 37 and first oil storing groove 34. Therefore, even though the rotation directions of the drive and driven gears 8 and 9 are opposite to those of the first embodiment, since the storing portions 36b and 37b have a high holding performance of the lubricating oil, the lubricating performance in the lubricating oil film forming areas X and Y can be increased. Other working and effect which are the same as those of the first embodiment can be also obtained in the present embodiment.

Fifth Embodiment

Figure 12:
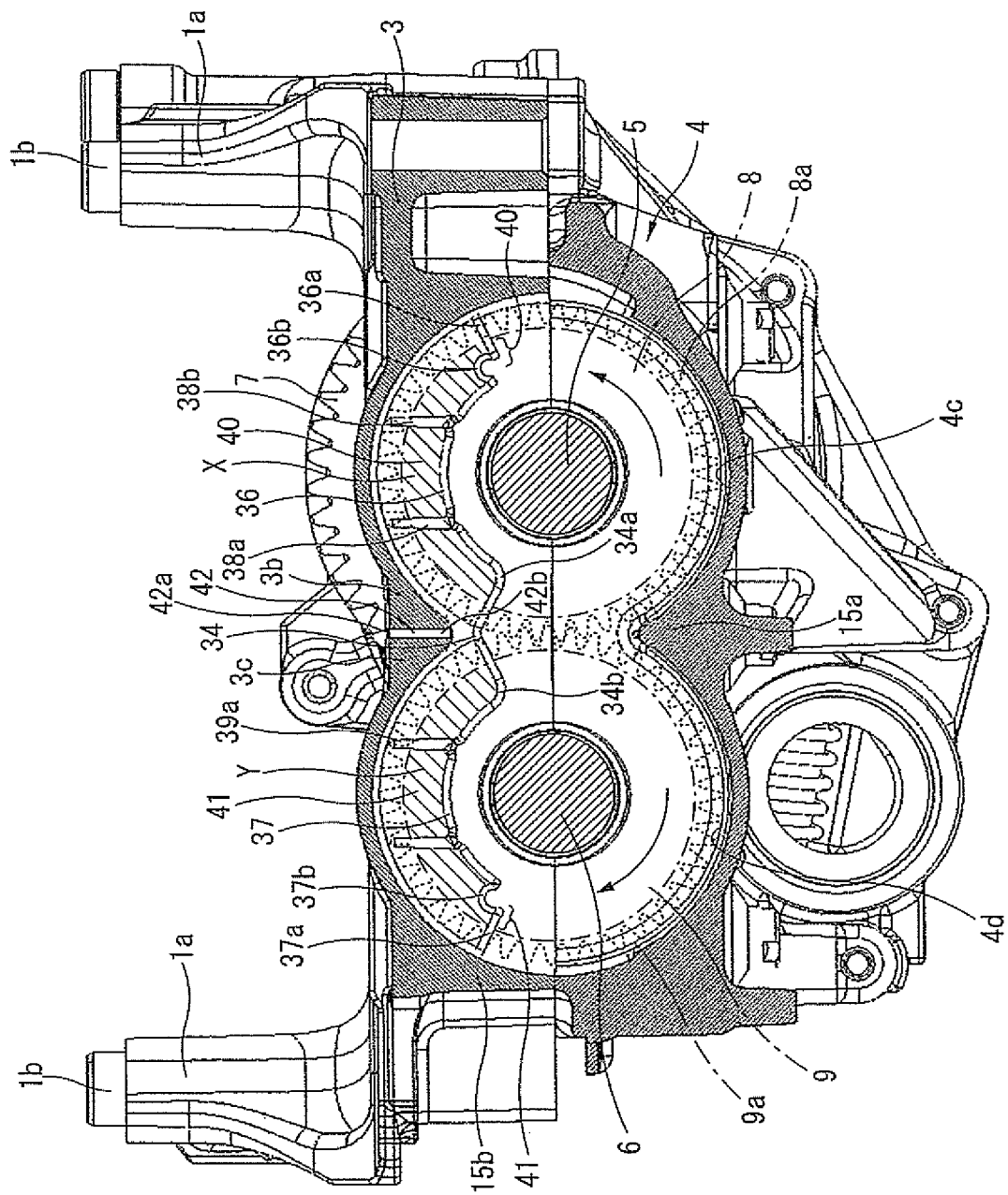
FIG. 12 is a fifth embodiment of the present invention, showing a sectional view taken along the line B-B of FIG. 5.

FIG. 12 shows a fifth embodiment of the present invention. In the present embodiment, the rotation directions of the drive shaft 5 and the driven shaft 6 are the same as those of the first to third embodiments. At an upper wall of the upper housing 3, a penetration hole 42 that connects the outside of the upper housing 3 and the accommodation section 10 is formed.

When explaining this with reference to the drawing, the first oil storing groove 34, the groove passages 36 and 37 and the vertical groove passages 38a to 39b etc. are formed at an upper side in the gravity direction of the thrust receiving portions 32a to 33b. That is, the first oil storing groove 34, the groove passages 36 and 37, the vertical groove passages 38a to 39b and the pair of storing portions 36b and 37b shown in FIG. 11 of the fourth embodiment are formed in reverse at the gravity direction upper side.

Regarding the oil storing grooves 34 and 35 etc., in the same manner as the above embodiments, they are formed by the arc band-shaped protuberances 40 and 41 formed at the thrust receiving portions 32a to 33b.

The penetration hole 42 is formed at an upper wall portion 3b, located at the gravity direction upper side, of the upper housing 3 by penetrating a substantially middle portion in a width direction of the upper wall portion 3b along a vertical direction. One end opening 42a of this penetration hole 42 opens to a recessed groove 3c that is formed on an upper surface in the middle in the width direction of the upper wall portion 3b. Further, the other end opening 42b that faces the accommodation section 10 opens to a position along the rotation directions of the drive and driven gears 8 and 9 at the thrust receiving portions 32a to 33b.

Therefore, in the present embodiment, when the drive and driven gears 8 and 9 rotate in arrow directions shown in the drawing, the lubricating oil accumulating on the inner bottom surfaces 4c and 4d of the lower housing 4 is spread or sprinkled over by the helical teeth 8a and 9a of the drive and driven gears 8 and 9. This spread lubricating oil is received by the pair of storing portions 36b and 37b, the groove passages 36 and 37 and the first oil storing groove 34. The received lubricating oil is held once in the groove passages 36 and 37 etc. as it is, and also flows into the vertical groove passages 38a to 39b and is held in these vertical groove passages 38a to 39b.

Subsequently, the lubricating oil is supplied between the thrust receiving portions 32a to 33b and the thrust flange portions 29a to 30b, especially, to all the gravity direction upper side between the thrust receiving portions 32a to 33b and the thrust flange portions 29a to 30b, then the lubricating performance in the lubricating oil film forming areas X and Y is increased. Hence, in the same manner as the above embodiments, the occurrence of abrasion of the thrust receiving portions 32a to 33b can be suppressed.

Further, the lubricating oil having been discharged from the internal combustion engine and fallen adheres to the upper surface of the upper wall portion 3b of the upper housing 3, and is collected and stored in the recessed groove 3c. This stored lubricating oil directly drips and is supplied to the meshing portion of the helical teeth 8a and 9a of the drive and driven gears 8 and 9 and the stepped recesses 31a and 31b etc. from the penetration hole 42. Therefore, the lubricating oil is supplied to the oil storing grooves 34 and 35 etc. along the rotation directions of the drive and driven gears 8 and 9, and also flows between the thrust receiving portions 32a to 33b and the thrust flange portions 29a to 30b. The lubricating oil then spread over the lubricating oil film forming areas X and Y.

Accordingly, together with active supply and holding of the lubricating oil to and in the oil storing grooves 34 and 35 etc. by the spread or sprinkling of the lubricating oil by the helical teeth 8a and 9a, the supply of the lubricating oil to the lubricating oil film forming areas X and Y is facilitated. That is, the lubricating performance in these areas is sufficiently increased.

In addition, in the present embodiment, as a rotation speed of the drive and driven shafts 5 and 6 is higher, the lubricating performance can be more increased with the lubricating oil being held or stored in the oil storing grooves 34 and 35. On the other hand, at a low speed at which there is almost no need to lubricate the thrust receiving portions 32a to 33b, especially at the engine start at which the viscosity of the lubricating oil is high, the lubricating oil is hard to store in the oil storing grooves 34 and 35. Because of this decrease in the holding performance of the lubricating oil, there is no influence by the viscosity. An effect of reducing the rotational resistance of each of the drive shaft 5 and the driven shaft 6 can thus be expected.

It is effective in a case where a rolling bearing such as a needle bearing or a ball bearing which does not require plenty lubricating oil is used as the bearing portions of the drive and driven shafts 5 and 6 of the present embodiment.

The present invention is not limited to the configurations of the above embodiments. For instance, the oil storing grooves 34 and 35 and the groove passages 36 and 37 etc. could be formed at a thrust receiving portion on a rear end wall inner surface, located at the oil pump 2, of the lower housing 4, or might be formed at the upper housing 3. Further, the oil storing groove etc. could be formed on an outer side surface of the other partition wall 16a.

Furthermore, as the bearing portions of the drive and driven shafts 5 and 6, the needle bearing or the ball bearing could be used.

As the balancer device based on the embodiments explained above, for instance, the followings are raised.

As one aspect of the present invention, a balancer device for an internal combustion engine comprises: a housing having therein an accommodation section into which lubricating oil can flow; a bearing portion provided in the accommodation section; a balancer shaft rotatably supported by the bearing portion, a rotation force being transmitted to the balancer shaft from the internal combustion engine; an arc-shaped thrust receiving portion which a part of the balancer shaft can contact from a rotation axis direction of the balancer shaft; and a recessed portion provided at an end portion, which is located at an against side of a rotation direction of the balancer shaft, of the thrust receiving portion.

By holding the lubricating oil in the recessed portion, the thrust receiving portion is effectively lubricated, then abrasion of the thrust receiving portion can be reduced.

As a preferable balancer device, the recessed portion opens upward in a vertical direction. The lubricating oil can effectively held in the recessed portion.

As a preferable balancer device, the balancer shaft is provided with a gear that is structured to transmit the rotation, and a force in a direction in which a part of the balancer shaft contacts the thrust receiving portion acts on the gear.

Even if a strong thrust force acts on the thrust receiving portion, the lubricating performance of the thrust receiving portion is increased by the lubricating oil held in the recessed portion.

As a preferable balancer device, a side surface of the gear contacts the thrust receiving portion.

The lubricating oil is supplied to the recessed portion by rotation of the gear with the lubricating oil adhering to the side surface of the gear, and the lubricating oil held in the recessed portion adheres to the thrust receiving portion, then the lubricating performance can be increased.

As a preferable balancer device, a groove that communicates with the recessed portion is formed at the thrust receiving portion.

The lubricating oil flows into the groove from the recessed portion, thereby widely spreading the lubricating oil.

As a preferable balancer device, the groove has a plurality of grooves.

As another aspect of the present invention, a balancer device for an internal combustion engine comprises: an upper housing located at an upper side in a vertical direction in a mounting state to the internal combustion engine; a lower housing located at a lower side in the vertical direction in the mounting state to the internal combustion engine and connected to the upper housing; a bearing portion formed between the upper housing and the lower housing; a drive side balancer shaft rotatably supported by the bearing portion and having a drive side reverse gear to which a rotation force is transmitted from the internal combustion engine; a driven side balancer shaft rotatably supported by the bearing portion and having a driven side reverse gear which meshes with the drive side reverse gear with lubricating oil adhering to the driven side reverse gear and rotates in a direction from a meshing portion toward a bottom of the lower housing; a pair of arc-shaped thrust receiving portions which are provided in the lower housing and which the drive side reverse gear and the driven side reverse gear contact respectively; and a recessed portion provided at a position where both the thrust receiving portions are close to each other.

As a preferable balancer device, a force in a rotation axis direction in which the drive side reverse gear and the driven side reverse gear contact the thrust receiving portions through the drive and driven side balancer shafts by the mesh of the drive and driven side reverse gears acts on the drive side reverse gear and the driven side reverse gear.

Even if a strong thrust force acts on the thrust receiving portion, shortage of the lubricating oil for the thrust receiving portion is solved by the lubricating oil held in the recessed portion.

As a preferable balancer device, each of the drive side reverse gear and the driven side reverse gear is a helical gear.

It is possible to deaden a meshing noise of the drive side reverse gear and the driven side reverse gear by large areas of the helical gears.

As a preferable balancer device, axial direction side surfaces of the drive side reverse gear and the driven side reverse gear contact the respective thrust receiving portions.

The lubricating oil that adheres to the meshing portion of the drive and driven gears can be held in the recessed portion by a gear pump operation of the drive and driven gears.

As a preferable balancer device, the lower housing has therein an accommodation section in which lubricating oil accumulates.

The lubricating oil accumulating in the accommodation section is spread or sprinkled over by the drive side reverse gear and the driven side reverse gear, then the lubricating oil can be held in the recessed portion.

As a preferable balancer device, the recessed portion is formed into a V-shape viewed from a rotation axis direction of each balancer shaft.

By forming the recessed portion into the V-shape, an area of the thrust receiving portion can be increased as much as possible. Therefore, a surface pressure of each of the gears, which acts on the thrust receiving portion, can be reduced to a minimum.

As a preferable balancer device, the recessed portion is formed into a rectangular shape viewed from a rotation axis direction of each balancer shaft.

Since a volume of the recessed portion can be increased as much as possible, plenty of lubricating oil can be held or stored.

As a preferable balancer device, the recessed portion is provided at each of the pair of thrust receiving portions.

Since the recessed portions are provided at both of the thrust receiving portions, the lubricating oil can be supplied between a thrust receiving area of the one thrust receiving portion and the drive side reverse gear and between a thrust receiving area of the other thrust receiving portion and the driven side reverse gear.

As a preferable balancer device, the recessed portion is provided at an uppermost position, in the vertical direction, of each thrust receiving portion.

It is possible to supply the lubricating oil to each recessed portion from a position with consideration given to the gravity.

As a further aspect of the present invention, a balancer device for an internal combustion engine comprises: an upper housing located at an upper side in a vertical direction in a mounting state to the internal combustion engine; a lower housing located at a lower side in the vertical direction in the mounting state to the internal combustion engine and connected to the upper housing; a bearing portion formed between the upper housing and the lower housing; a drive side balancer shaft rotatably supported by the bearing portion and having a drive side reverse gear to which a rotation force is transmitted from the internal combustion engine; a driven side balancer shaft rotatably supported by the bearing portion and having a driven side reverse gear which meshes with the drive side reverse gear with lubricating oil adhering to the driven side reverse gear and rotates in a direction from a meshing portion toward the upper housing; a pair of arc-shaped thrust receiving portions which are provided in the lower housing and which the drive side reverse gear and the driven side reverse gear contact respectively; and a recessed portion provided at an end portion, which is located at an against side of a rotation direction of each balancer shaft, of each thrust receiving portion.

Even though rotations of the balancer shafts are opposite to those of the balancer shafts described in claim 7, it is possible to hold the lubricating oil in the recessed portion by and according to the rotations of the balancer shafts.

As a further aspect of the present invention, a balancer device for an internal combustion engine comprises: an upper housing located at an upper side in a vertical direction in a mounting state to the internal combustion engine; a lower housing located at a lower side in the vertical direction in the mounting state to the internal combustion engine and connected to the upper housing; a bearing portion formed between the upper housing and the lower housing; a drive side balancer shaft rotatably supported by the bearing portion and having a drive side reverse gear to which a rotation force is transmitted from the internal combustion engine; a driven side balancer shaft rotatably supported by the bearing portion and having a driven side reverse gear which meshes with the drive side reverse gear and rotates with lubricating oil adhering to the driven side reverse gear; a pair of arc-shaped thrust receiving portions which are provided in the upper housing and which the drive side reverse gear and the driven side reverse gear contact respectively; and a recessed portion provided at an end portion, which is located at an against side of a rotation direction of each balancer shaft, of each thrust receiving portion.

As a rotation speed of the balancer shafts is higher, the lubricating performance can be more increased with the lubricating oil being held or stored in the recessed portion. On the other hand, at a low speed at which there is almost no need to lubricate the thrust receiving portions, especially at the engine start at which the viscosity of the lubricating oil is high, the lubricating oil is hard to store in the recessed portion. Because of this, rotational resistance of each of the balancer shafts can be reduced.

As a preferable balancer device, the upper housing has a penetration hole that connects an outside of the upper housing and an accommodation section formed in the upper housing.

The lubricating oil adhering to an upper surface of the upper housing is introduced into an accommodation section from the penetration hole, and this lubricating oil can be supplied to the recessed portion from the meshing portion of the drive side reverse gear and the driven side reverse gear.

As a preferable balancer device, the penetration hole is formed along the vertical direction of the upper housing, and an end portion, at the accommodation section side, of the penetration hole is an opening that opens to a position along the rotation directions of the drive and driven side reverse gears at the thrust receiving portions.

The lubricating oil dripping in the accommodation section from the penetration hole can be supplied to the recessed portion along the rotation directions of the drive and driven side reverse gears.

The invention claimed is:

1. A balancer device for an internal combustion engine comprising:
   a housing having therein an accommodation section into which lubricating oil can flow;
   a bearing portion provided in the accommodation section;
   a balancer shaft rotatably supported by the bearing portion and provided with a gear, a rotation force being transmittable to the balancer shaft from the internal combustion engine;
   an arc-shaped thrust receiving portion disposed to permit contact with a part of the balancer shaft from a rotation axis direction of the balancer shaft; and
   a recessed portion provided at an end portion, which is located at a side of a rotation direction of the balancer shaft, of the thrust receiving portion,
   wherein the thrust receiving portion is provided such that the gear provided at the balancer shaft is permitted to contact the thrust receiving portion from the rotation axis direction of the balancer shaft, and
   wherein the recessed portion is formed such that when viewed from a direction orthogonal to a rotation axis of the balancer shaft, the recessed portion overlaps tips of the gear, and the recessed portion is hollow in the rotation direction of the balancer shaft.

2. The balancer device for the internal combustion engine as claimed in claim 1, wherein:
   the recessed portion opens upward in a vertical direction.

3. The balancer device for the internal combustion engine as claimed in claim 1, wherein:
   the gear is arranged such that force in a direction in which a part of the balancer shaft contacts the thrust receiving portion acts on the gear.

4. The balancer device for the internal combustion engine as claimed in claim 3, wherein:
   a side surface of the gear contacts the thrust receiving portion.

5. The balancer device for the internal combustion engine as claimed in claim 1, wherein:
   a groove that communicates with the recessed portion is formed at the thrust receiving portion.

6. The balancer device for the internal combustion engine as claimed in claim 5, wherein:
   the groove has a plurality of grooves.

7. A balancer device for an internal combustion engine comprising:
   an upper housing located at an upper side in a vertical direction in a mounting state to the internal combustion engine;
   a lower housing located at a lower side in the vertical direction in the mounting state to the internal combustion engine and connected to the upper housing;
   a bearing portion formed between the upper housing and the lower housing;
   a drive side balancer shaft rotatably supported by the bearing portion and having a drive side reverse gear to which a rotation force is transmittable from the internal combustion engine;
   a driven side balancer shaft rotatably supported by the bearing portion and having a driven side reverse gear configured to mesh with the drive side reverse gear and to permit lubricating oil to adhere to the driven side reverse gear, and disposed to rotate in a direction from a meshing portion toward a bottom of the lower housing;
   a pair of arc-shaped thrust receiving portions which are provided in the lower housing and which the drive side reverse gear and the driven side reverse gear are permitted to contact respectively from a rotation axis direction of each balancer shaft; and
   a recessed portion provided at a position where both the thrust receiving portions are close to each other,
   wherein the recessed portion is formed such that when viewed from a direction orthogonal to a rotation axis of each balancer shaft, the recessed portion overlaps tips of the drive and driven side reverse gears, and the recessed portion is hollow in a rotation direction of each balancer shaft.

8. The balancer device for the internal combustion engine as claimed in claim 7, wherein:
   the drive side reverse gear and the driven side reverse gear are arranged such that force in a rotation axis direction in which the drive side reverse gear and the driven side reverse gear contact the thrust receiving portions through the drive and driven side balancer shafts by the meshing of the drive and driven side reverse gears acts on the drive side reverse gear and the driven side reverse gear.

9. The balancer device for the internal combustion engine as claimed in claim 8, wherein:
   each of the drive side reverse gear and the driven side reverse gear is a helical gear.

10. The balancer device for the internal combustion engine as claimed in claim 7, wherein:
    axial direction side surfaces of the drive side reverse gear and the driven side reverse gear contact the respective thrust receiving portions.

11. The balancer device for the internal combustion engine as claimed in claim 10, wherein:
    the lower housing has therein an accommodation section in which lubricating oil accumulates.

12. The balancer device for the internal combustion engine as claimed in claim 7, wherein:
    the recessed portion is formed into a V-shape viewed from a rotation axis direction of each balancer shaft.

13. The balancer device for the internal combustion engine as claimed in claim 7, wherein:
    the recessed portion is formed into a rectangular shape viewed from a rotation axis direction of each balancer shaft.

14. The balancer device for the internal combustion engine as claimed in claim 7, wherein:
    the recessed portion is provided at each of the pair of thrust receiving portions.

15. The balancer device for the internal combustion engine as claimed in claim 14, wherein:
    the recessed portion is provided at an uppermost position, in the vertical direction, of each thrust receiving portion.

16. A balancer device for an internal combustion engine comprising:
    an upper housing located at an upper side in a vertical direction in a mounting state to the internal combustion engine;

a lower housing located at a lower side in the vertical direction in the mounting state to the internal combustion engine and connected to the upper housing;

a bearing portion formed between the upper housing and the lower housing;

a drive side balancer shaft rotatably supported by the bearing portion and having a drive side reverse gear to which a rotation force is transmittable from the internal combustion engine;

a driven side balancer shaft rotatably supported by the bearing portion and having a driven side reverse gear configured to mesh with the drive side reverse gear and to permit lubricating oil to adhere to the driven side reverse gear, and disposed to rotate in a direction from a meshing portion toward the upper housing;

a pair of arc-shaped thrust receiving portions which are provided in the lower housing and which the drive side reverse gear and the driven side reverse gear are permitted to contact respectively from a rotation axis direction of each balancer shaft; and a recessed portion provided at an end portion, which is located at a side of a rotation direction of each balancer shaft, of each thrust receiving portion, wherein the recessed portion is formed such that when viewed from a direction orthogonal to a rotation axis of each balancer shaft, the recessed portion overlaps tips of the drive and driven side reverse gears, and the recessed portion is hollow in the rotation direction of each balancer shaft.

17. A balancer device for an internal combustion engine comprising:

an upper housing located at an upper side in a vertical direction in a mounting state to the internal combustion engine;

a lower housing located at a lower side in the vertical direction in the mounting state to the internal combustion engine and connected to the upper housing;

a bearing portion formed between the upper housing and the lower housing;

a drive side balancer shaft rotatably supported by the bearing portion and having a drive side reverse gear to which a rotation force is transmittable from the internal combustion engine to the drive side reverse gear;

a driven side balancer shaft rotatably supported by the bearing portion and having a driven side reverse gear configured to mesh with the drive side reverse gear and to permit lubricating oil to adhere to the driven side reverse gear, and disposed to rotate with lubricating oil adhering to the driven side reverse gear;

a pair of arc-shaped thrust receiving portions which are provided in the upper housing and which the drive side reverse gear and the driven side reverse gear are permitted to contact respectively from a rotation axis direction of each balancer shaft; and a recessed portion provided at an end portion, which is located at a side of a rotation direction of each balancer shaft, of each thrust receiving portion, wherein the recessed portion is formed such that when viewed from a direction orthogonal to a rotation axis of each balancer shaft, the recessed portion overlaps tips of the drive and driven side reverse gears, and the recessed portion is hollow in the rotation direction of each balancer shaft.

18. The balancer device for the internal combustion engine as claimed in claim 17, wherein:

the upper housing has a penetration hole that connects an outside of the upper housing and an accommodation section formed in the upper housing.

19. The balancer device for the internal combustion engine as claimed in claim 18, wherein:

the penetration hole is formed along the vertical direction of the upper housing, and an end portion, at the accommodation section side, of the penetration hole is an opening that opens to a position along the rotation directions of the drive and driven side reverse gears at the thrust receiving portions.

* * * * *